Figure 1:
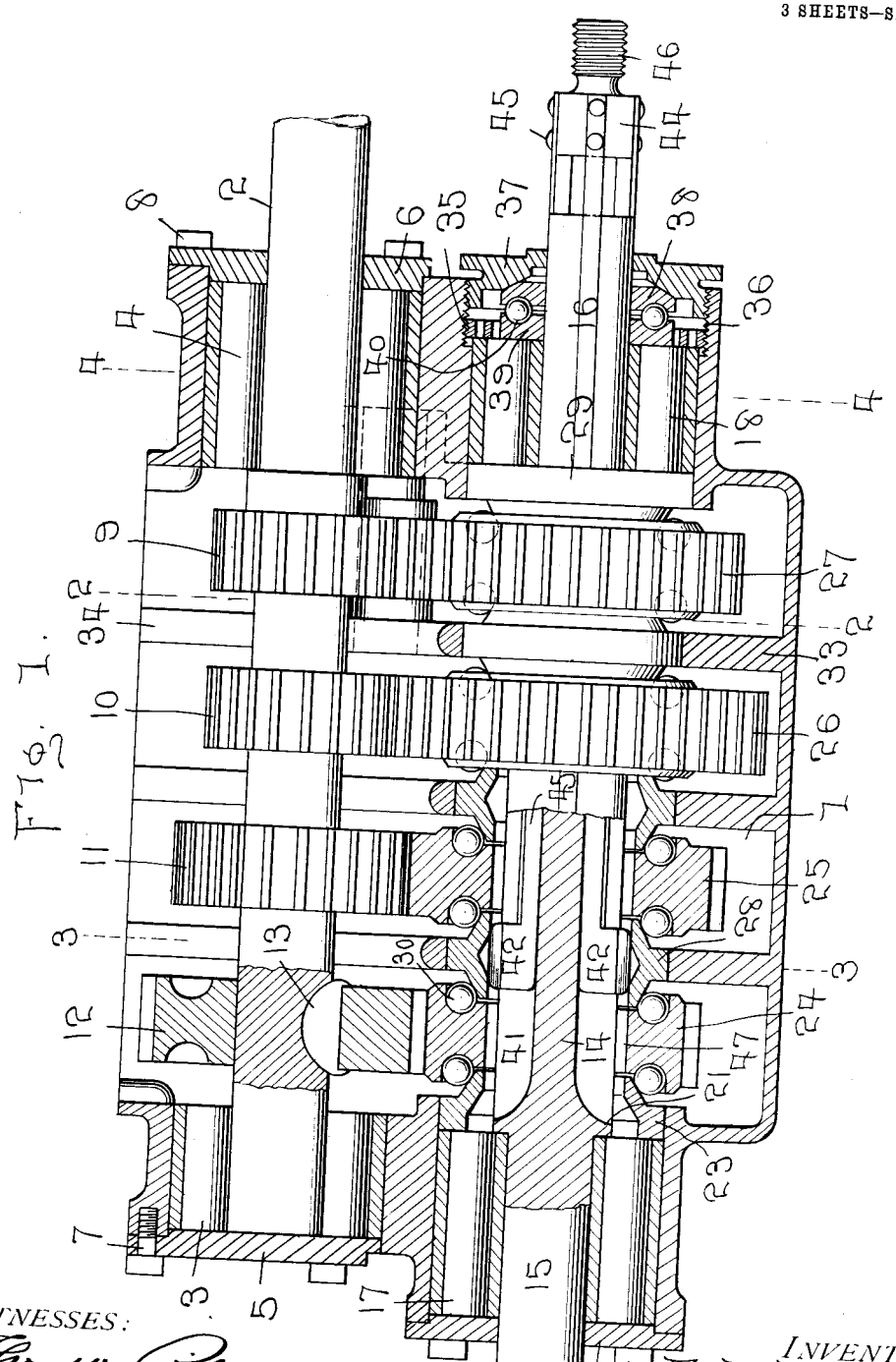

F. A. BABCOCK.
TRANSMISSION GEARING.
APPLICATION FILED SEPT. 9, 1911.

1,037,718.

Patented Sept. 3, 1912.
3 SHEETS—SHEET 1.

WITNESSES:
Thos. W. Riley
M. Newcomb

INVENTOR
F. A. Babcock
BY
W. T. FitzGerald & Co.
Attorneys

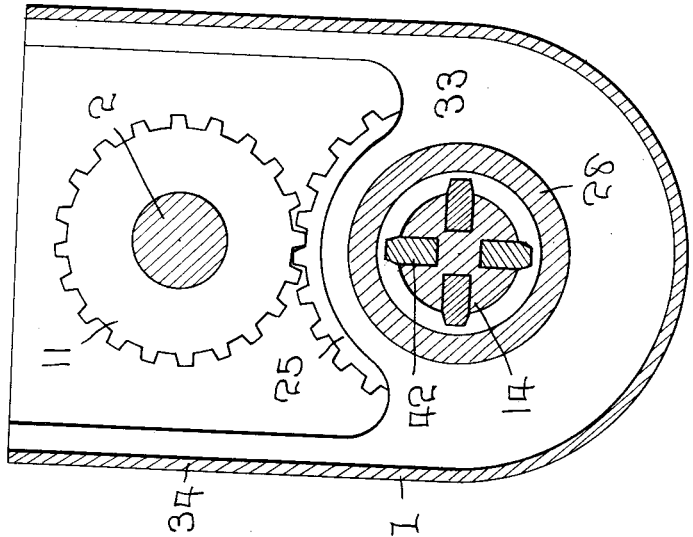
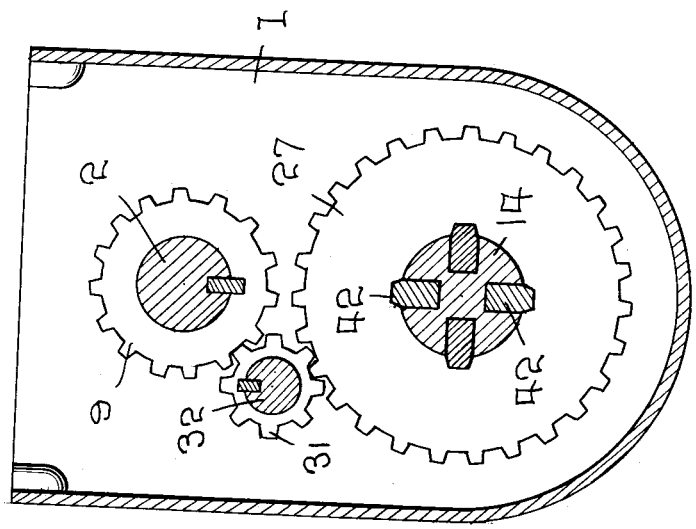

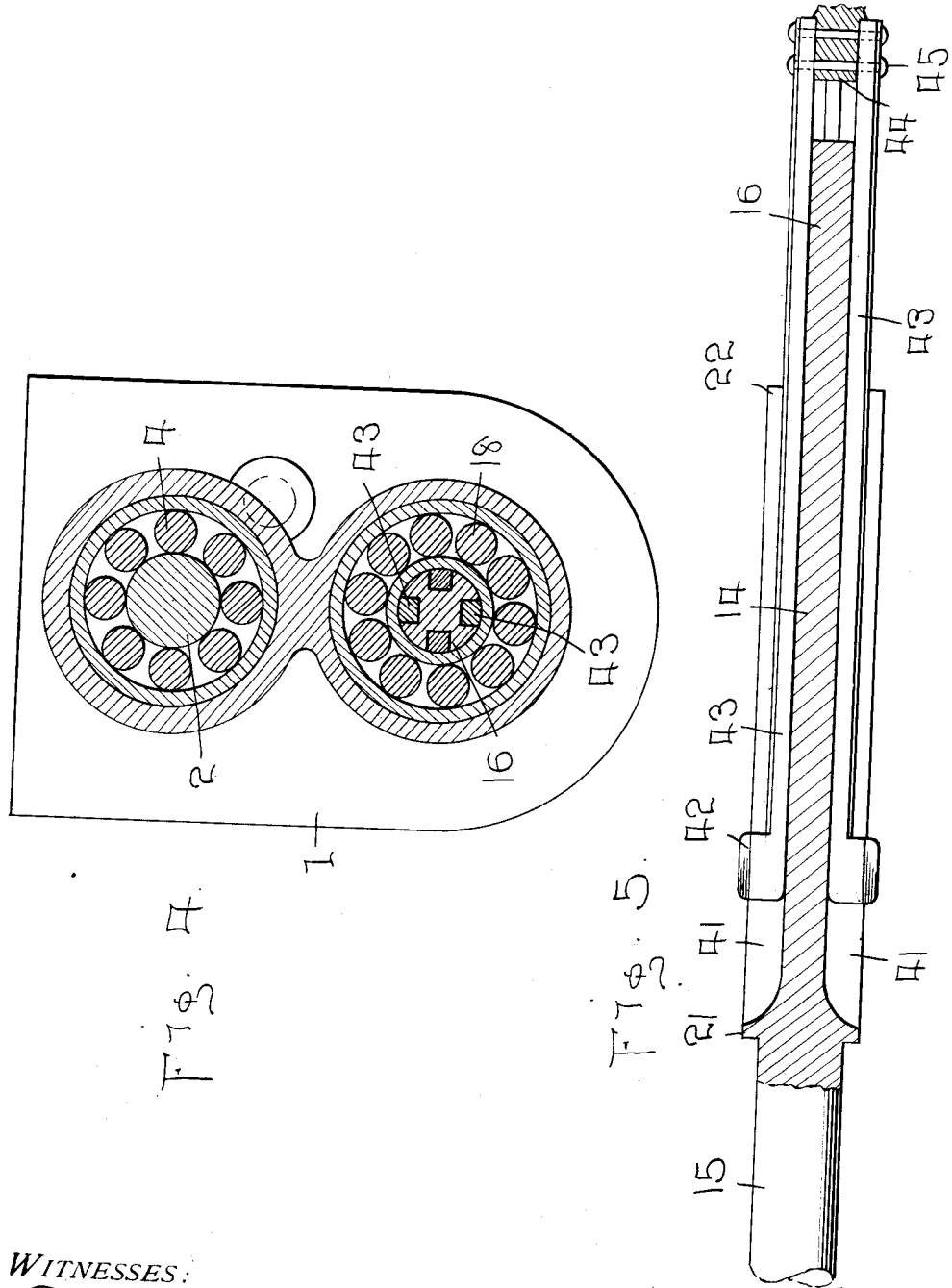

UNITED STATES PATENT OFFICE.

FRANK A. BABCOCK, OF SYRACUSE, NEW YORK, ASSIGNOR OF ONE-HALF TO JOHN E. MALONEY, OF SYRACUSE, NEW YORK.

TRANSMISSION-GEARING.

1,037,718.  Specification of Letters Patent.  Patented Sept. 3, 1912.

Application filed September 9, 1911. Serial No. 648,450.

*To all whom it may concern:*

Be it known that I, FRANK A. BABCOCK, a citizen of the United States, residing at Syracuse, in the county of Onondaga and State of New York, have invented certain new and useful Improvements in Transmission-Gearing; and I do hereby declare the following to be a full, clear, and exact description of the invention, such as will enable others skilled in the art to which it appertains to make and use the same.

This invention relates to transmission gearing and more particularly to a transmission gearing having three forward speeds and a reverse speed.

An object of the invention is to provide a transmission gearing having several forward speeds and a reverse speed, the speeds to be varied by manipulating sliding keys.

Another object is to provide a transmission gearing of this type composed of a shaft having gears rigid therewith and a second shaft parallel to the first shaft with gears loosely mounted thereon and in mesh with the gears of the first shaft, said gears to be temporarily locked with the second shaft by means of sliding keys working within grooves of the shaft upon which the loose gears are mounted.

Another object is to provide a transmission gearing of this character having a shaft with keys sliding in grooves thereon and loose gears mounted upon said shaft and spaced from one another by cones and ball bearings, and ball and roller bearings for the opposite ends of the shaft.

Another object is to provide a transmission gearing of this nature having parallel shafts, rigid gears upon one shaft, loose gears upon the opposite shaft, said gears being in mesh with one another at all times, means for locking one of the loose gears with the shaft upon which it is mounted, a reversing gear between one of the gears on one shaft and the opposite gear on the other shaft, a suitable casing for these parts and adjustable bearings within the casing, and, another object is to provide a transmission gearing of this character, which may be readily changed from one speed to another and which will be effective in its operation.

Other objects and advantages will be hereinafter set forth and pointed out in the specification and claims.

In the accompanying drawings which are made a part of this application, Figure 1 is a longitudinal sectional view through the entire device, some of the parts being shown in section. Fig. 2 is a cross sectional view on the line 2—2 of Fig. 1. Fig. 3 is a similar view on the line 3—3 of Fig. 1. Fig. 4 is a like view on the line 4—4 of Fig. 1, and, Fig. 5 is a longitudinal sectional view through the grooved shaft, showing the slidable keys within their grooves.

Referring to the drawings in which similar reference numerals designate corresponding parts throughout the several views, 1 indicates a casing of proper form and having one side open, through which the parts may be placed in proper position or removed, this open side being closed by a suitable cover (not shown). The casing 1 is substantially oblong and extending from end to end near the open side of the casing, is the shaft 2 which is connected with a motor, or other source of power, one end of the shaft being secured within the casing at one end thereof and surrounded by roller bearings 3, while the opposite end projects through the opposite end of the casing. At the end of the casing through which the shaft 2 projects, are the roller bearings 4, similar to the roller bearings 3, said rollers surrounding the shaft at this point. At the outer ends of the rollers 3 and 4 are suitable heads 5 and 6, respectively, which are secured to the casing by screws 7 and 8, or other suitable means.

Keyed to the shaft 2, between the roller bearings 3 and 4, are the gear wheels 9, 10, 11 and 12, which are suitably spaced from one another. These gear wheels are preferably keyed to the shaft 1, by means of the keys 13, which are substantially oval shaped, the opposite ends projecting a short distance beyond the sides of the gears and being bent thereagainst to securely fasten the gear wheels in proper position upon the shaft to which they are secured. The gear wheels 9 and 10 are of the same diameter, while the gear 11 is slightly larger than these first two gears and the gear 12 has a greater diameter than the gear 11. The purpose of this arrangement of gears of various diameters will presently appear.

Extending from the casing 1 below the shaft 2 and parallel therewith, is the second shaft 14, which may extend to the rear axle of a vehicle (provided this transmission gearing is employed upon a vehicle) or may be made a part thereof. This shaft is provided with the reduced end portions 15 and 16 near the opposite ends of the casing 1, around which reduced end portions the bearing rollers 17 and 18, respectively, mounted between suitable bushings 17' and 18', are positioned. Opposite the rollers 17 is secured the head 19, by means of the screws 20. The parts pressing against the outer ends of the bushings 18' will presently be described. The inner ends of the roller bushings 17' and 18' press against the shoulders 21 and 22, respectively, of the shaft 14, and are thus held in position. Also pressing against the inner ends of the rollers 17 is the half cone 23, which is loosely mounted upon the shaft 14.

Loosely mounted upon the shaft 14 are the gears 24, 25, 26 and 27, which are spaced from one another by means of the cones 28 positioned therebetween, surrounding and spaced from the shaft 14. Between the cones 28 and the gear wheels 24, 25, 26 and 27 and also between the gear wheel 24 and the half cone 23 and the gear wheel 27 and the adjusting cone 29, are the ball bearings 30, which travel within suitable channels in the sides of the gear wheels and upon the beveled outer surfaces of the cones. The gear wheels 24, 25 and 26 on the shaft 14 are in mesh at all times with the rigid gears 12, 11 and 10, respectively, carried by the shaft 2, while the gear wheel 27 is at all times in mesh with the intermediary gear 31, carried on the stub shaft 32, which gear also is in mesh with the gear wheel 9 carried by the shaft 2. The gears 9, 31 and 27 are for reverse speed and the reverse motion is transmitted to the shaft 14 when the gear wheel 27 is temporarily keyed thereto, as will be later described.

Integral with the casing 1 and between the gears mounted on the shaft 14, are the cone supporting partitions 33, which extend a short distance above the cones when the latter are in proper position around the shaft 14, and these partitions are provided with suitable openings and receive the cones 28 and retain the latter in place, these cones fitting snugly within the partitions 33. The partitions 33 may, if desired, extend upwardly to the open sides of the casing 1, but are preferably broken away just above the cones 28, the edges only of the partitions being continued in the form of ribs 34 in the upper half of the casing between the gears 12 and 11, 11 and 10, and 10 and 9. These ribs and partitions further tend to strengthen the sides of the casing.

Pressing against the outer edge of the outer roller bushing 18' is the exteriorly threaded nut 35, which works upon the threads 36 in the exterior of the casing 1, outwardly of the outer edge of said bushing.

Working also upon the threads 36 is the cap or head 37, outwardly of the nut 35, said head 37 being provided with a central opening through which the reduced end 16 of the shaft 14 rotates. The inner face of the head 37 is beveled and resting against this beveled surface is the similarly beveled face of the collar 38, fitting snugly around the reduced end 16 of the lower shaft and spaced from the collar 39, which is also positioned upon the reduced end 16, but rests against the outer edge of the inner bushings 18', said collars being spaced from one another by means of the ball bearings 40, operating in circular channels in the adjacent faces of the collars 38 and 39. The nut 35 is provided with a central opening large enough to freely accommodate the collar 39, thus preventing the latter from interfering with the nut. To compensate for the wear of the ball bearings 40, the head 37 may be screwed inwardly upon the threads 36 to press tightly against the collar 38 and force the latter against the ball bearings positioned between this collar and the collar 39. To force the roller bearings 18 inwardly and compel the adjusting cone 39 to move in the same direction and tighten up the gears loosely mounted on the shaft 14 on the cones positioned therebetween and also the ball bearings between these parts, the head 37 must be removed and the nut 35 rotated upon the threads 36, as will be understood.

The shaft 14, from its shoulder 21 to its opposite end, is provided with the oppositely positioned key way slots 41, within which are positioned keys 42, the keys 42 having the long stems 43, which extend parallel to one another for a short distance beyond the reduced end 16 of the shaft and are secured together by means of the block 44 with the rivets or other securing means 45 passing therethrough and through the shanks. The block 44 is reduced and rounded outwardly of the ends of the key stems 43 (as shown at 46), said rounded portion being provided with screw threads to receive the lever or other means for moving the keys 42 longitudinally of the shaft 14 to change speeds. The opposite engaging edges of the keys 42 are preferably beveled at angles of about 30° in relation to the sides thereof, to facilitate ready engagement with or disengagement from the gears 24, 25, 26 and 27. The keys 42 and keyway slots 41 may be any number in practice with a corresponding number of locking slots 47 in each loose gear, but I prefer to employ four of each, as illustrated.

The keys 42 are moved longitudinally within the key way slots 41 and, as the keys project beyond the periphery of the shaft they will engage within the locking slots 47 in the loose gears 24, 25, 26 or 27 when moved opposite one of these gears, and thus lock that gear with the shaft 14 to compel the latter to rotate at the desired rate of speed. When the keys 42 are drawn within one of the cones 28, however, they will not compel the cone to rotate, for the reason that the diameter of the interior of the cone is equal to or slightly greater than the distance from the outer edge of one of the keys 44 to the outer edge of the opposite key. Thus, when the keys are within a cone 28 there is no tendency on the part of the gears to cause the shaft 14 to rotate, the loose gears simply rotating freely around this lower shaft.

The keys 42 are illustrated as being within the cone 28 between the loose gears 24 and 25. For high speed the keys are shoved inwardly to lock the gear 24 with the shaft 14. The shaft 2 rotating, transmits power to the shaft 14, through the gear 12, permanently keyed therewith, and the gear 24 temporarily keyed to the lower shaft 14. For the next speed, the keys are drawn outwardly along the slots 41 until they are engaged within the locking slots of the gear 25, thus locking this gear with the shaft 14, all of the other loose gears being allowed to rotate freely around the shaft 14 without having any effect upon the latter. In this case the power is transmitted from the shaft 2 to the shaft 14 through the gears 11 and 25. For the low speed, keys 42 are drawn outwardly until they lock the loose gear 26 with the shaft 14, after which the rotary motion will be transmitted from the shaft 2 to the shaft 14 through the medium of the gears 26. For reverse speed, the keys 42 are drawn to their outward limit, locking the loose gear 27 temporarily with the shaft 14. In this instance the rotary motion is transmitted from the shaft 2 to the shaft 14 through the medium of the gear 9, rigid with the shaft 2, the small intermediary gear 31 and the normally loose gear 27, now temporarily keyed to the shaft 14. It will be seen that in this case the intermediary gear 31 will reverse the motion while transmitting the same to the gear 27 and the shaft 14 temporarily keyed therewith. In this manner we obtain a reverse speed, which may be of any rate desired, but the gears are illustrated as being of such diameter as to give a reverse speed of the same rate as the intermediate forward speed.

It will thus be seen that I have provided a transmission gearing having three forward speeds and a reverse speed. It will also be seen that any or all of the parts may readily be adjusted or repaired, or even replaced, by new parts, should such changes be necessary. It will also be seen that this transmission gearing will be effective in operation and, as all the parts thereof are of simple formation, it will be comparatively cheap to manufacture.

What I claim is:

1. Transmission gearing comprising a shaft, rigid gears on said shaft, a second shaft having a longitudinal groove and positioned parallel with the first shaft, gears loosely mounted upon the second shaft, stationary cones between the gears on the second shaft for spacing said gears in relation to one another, bearing balls carried in channels in opposite edges of the gears and engaged upon the cones, means for adjusting the spacing cones, an intermediary gear in mesh with a gear on the first shaft and the opposite gear on the second shaft, a key movable within the groove of the second shaft for temporarily locking one of the loose gears of the second shaft to the latter, a casing for said parts, bearings within said casing for the loose gears, and bearing rollers around the opposite ends of the shafts.

2. Transmission gearing comprising a shaft, rigid gears of different diameters on said shaft, a second shaft parallel with the first shaft and provided with longitudinal key receiving grooves, bearing rollers positioned around the ends of each shaft and working against sleeves positioned in the casing, gears loosely mounted upon the second shaft, cones for spacing the gears in relation to one another upon the second shaft, means for adjusting the spacing cones longitudinally of the said second shaft, an intermediary gear in mesh with a gear on the first shaft and the opposite gear on the second shaft, movable keys within said key receiving grooves of the second shaft for temporarily locking one of the loose gears to the second shaft, a casing for said parts, said movable keys being connected outwardly of the end of the second shaft and the casing, bearings within said casing for the movable parts, and integral partitions in said casing for supporting said spacing cones.

3. Transmission gearing comprising a shaft, gears spaced from one another and permanently keyed to said shaft, a second shaft parallel with the first shaft, bearing sleeves and rollers carried by the casing and positioned around the ends of the shafts to form bearing means therefor, gears loosely mounted upon the second shaft and in mesh with the gears of the first shaft, said gears being properly spaced from one another, spacing cones between said loosely mounted gears, means bearing on said spacing cones and carried by said loosely mounted gears for reducing friction, said shafts being extended through the casing, the gears upon said shafts being within the casing, the casing having partitions between the gears, said partitions being provided with openings to snugly receive the spacing cones, said spacing cones being snugly received within the openings in said partitions and thus held from contacting with the second shaft around which they are positioned, said second shaft being provided with opposite key ways extending longitudinally thereof, keys within said key ways and movable therein longitudinally of the shaft, means for connecting the outer ends of said keys outwardly of the casing and at the end of the second shaft, said loose keys being provided with locking key ways, said gears being adapted to be engaged at times in the key ways of the loose gears to temporarily lock the latter with the second shaft, and means for moving the keys within the key ways of the second shaft.

In testimony whereof I have signed my name to this specification in the presence of two subscribing witnesses.

FRANK A. BABCOCK.

Witnesses:
S. G. SCHLACHTER,
A. H. SCHLACHTER.